US006533444B2

(12) United States Patent
Lee

(10) Patent No.: US 6,533,444 B2
(45) Date of Patent: Mar. 18, 2003

(54) LIGHTING DIRECTIONAL SIGN FOR VEHICLE SIGNAL LIGHT

(76) Inventor: Wen I Auguste Lee, 3647 Nelson Pl., Fullerton, CA (US) 92835

(*) Notice: Subject to any disclaimer, the term of this patent is extended or adjusted under 35 U.S.C. 154(b) by 0 days.

(21) Appl. No.: 09/853,663

(22) Filed: May 12, 2001

(65) Prior Publication Data

US 2002/0012251 A1 Jan. 31, 2002

Related U.S. Application Data

(60) Provisional application No. 60/203,843, filed on May 12, 2000.

(51) Int. Cl.[7] .................................................. B60Q 1/26

(52) U.S. Cl. ....................... 362/540; 362/543; 362/544; 362/545; 362/800

(58) Field of Search ................................ 362/539, 540, 362/543, 544, 545, 548, 549, 367, 800; 116/48, 49, 54

(56) References Cited

U.S. PATENT DOCUMENTS 5,038,255 A * 8/1991 Nishihashi et al. ......... 362/226
5,373,280 A * 12/1994 Louy et al. .............. 340/425.5
6,158,882 A * 12/2000 Bischoff, Jr. ................ 362/249
6,257,746 B1 * 7/2001 Todd et al. ................. 362/140
6,264,353 B1 * 7/2001 Caraher et al. ............. 340/475

* cited by examiner

*Primary Examiner*—Thomas M. Sember
*Assistant Examiner*—John Amarantides
(74) *Attorney, Agent, or Firm*—Raymond Y. Chan; David and Raymond Patent Group

(57) ABSTRACT

A lighting directional sign includes a L-shaped illuminating unit including a casing, an illuminator protected by the casing, and an electric input connector provided on the casing and electrically connected with the illuminator, wherein the illuminating unit is disposed in a lamp chamber of a vehicle signal light and electrically connected with a power outlet of the vehicle signal light. The illuminating unit is aligned as an arrowhead shape in such a manner when the vehicle signal light is switched on, the illuminating unit is automatically switched on in order to signify the further motion of the vehicle.

7 Claims, 9 Drawing Sheets

30
23
2
1

LIGHTING DIRECTIONAL SIGN FOR VEHICLE SIGNAL LIGHT

CROSS REFERENCE RELATED TO THE APPLICATION

This is a regular application of a provisional application, Ser. No. 60/203,843, filed May 12, 2000.

BACKGROUND OF THE PRESENT INVENTION

1. Field of Invention

The present invention relates to signal light, and more particularly to a lighting directional sign for vehicle signal light which enhances the directional sign of the vehicle in order to highly increase the liability of driving.

2. Description of Related Arts

Thousands of accidents occur everyday because of the drivers' careless. Accidents usually occur especially when drivers want to cut lane on the road without a significant signal so that collisions may happen between vehicles. So, a significant turn signlight is important to a vehicle for attracting people's attention in order to avoid accidents occur.

Every vehicle has a pair of directional signlights for signifying the right and left directional signlight of the vehicle wherein the directional signlights are respectively mounted on two sides of a rear panel of the vehicle in such a manner when the left signlight is flashing, for example, the driver intentionally indicates that he or she wants either to make a left turn or to cut to the left lane. However, in order to keep the beauty appearance of the vehicle, the auto signlight system of the vehicle has a unique illuminated signlight in such a manner the directional signlights of the vehicle are illuminated in red light which is the same illuminated color of a brake signlight. When the user turns on the directional signlight for signifying the further motion of the vehicle, other drivers may not alert in the attending the directional signlight since they may get confuse with the brake signlight or others. So, other drivers may mislead by the signal such that an avoidable accident may occur.

Furthermore, if the illuminator of the directional signlight is broken down, there is no auxiliary signlight that can substitute the directional signlight for signifying the turning signal. Thus, since the directional signlight is mounted on the rear panel of the vehicle, the user may not find out the illuminator is not functioning such that unintentionally accident may occur while the user though he or she has turned on the directional signlight.

SUMMARY OF THE PRESENT INVENTION

A main object of the present invention is to provide a lighting directional sign for vehicle signal light which adapted for signifying the further motion of a vehicle clearly.

Another object of the present invention is to provide a lighting directional sign for vehicle signal light which is easy to install to an existing vehicle and in low cost.

Another object of the present invention is to provide a lighting directional sign for vehicle signal light which is reliable and highly effective strobe product to a vehicle.

Another object of the present invention is to provide a lighting directional sign for vehicle signal light which can be equipped with an existing vehicle with any alteration of the vehicle.

Accordingly, in order to accomplish the above objects, the present invention provides a lighting directional sign for vehicle signal light which comprises a base plate comprising a power outlet therein and a light bulb electrically connected to the power outlet, and a lamp cover for covering the base plate wherein a signal light chamber is provided therebetween.

The lighting directional sign comprises a L-shaped illuminating unit comprising a casing, an illuminator protected by the casing, and an electric input connector provided on the casing and electrically connected with the illuminator, wherein the illuminating unit is disposed in the lamp chamber of the signal light and electrically connected with the power outlet of the base plate.

Therefore, the illuminating unit is aligned as an arrowhead shape in such a manner when the signal light is switched on, the illuminating unit is flashing in order to signify the further motion of the vehicle.

DETAILED DESCRIPTION OF THE PREFERRED EMBODIMENT

Figure 1:
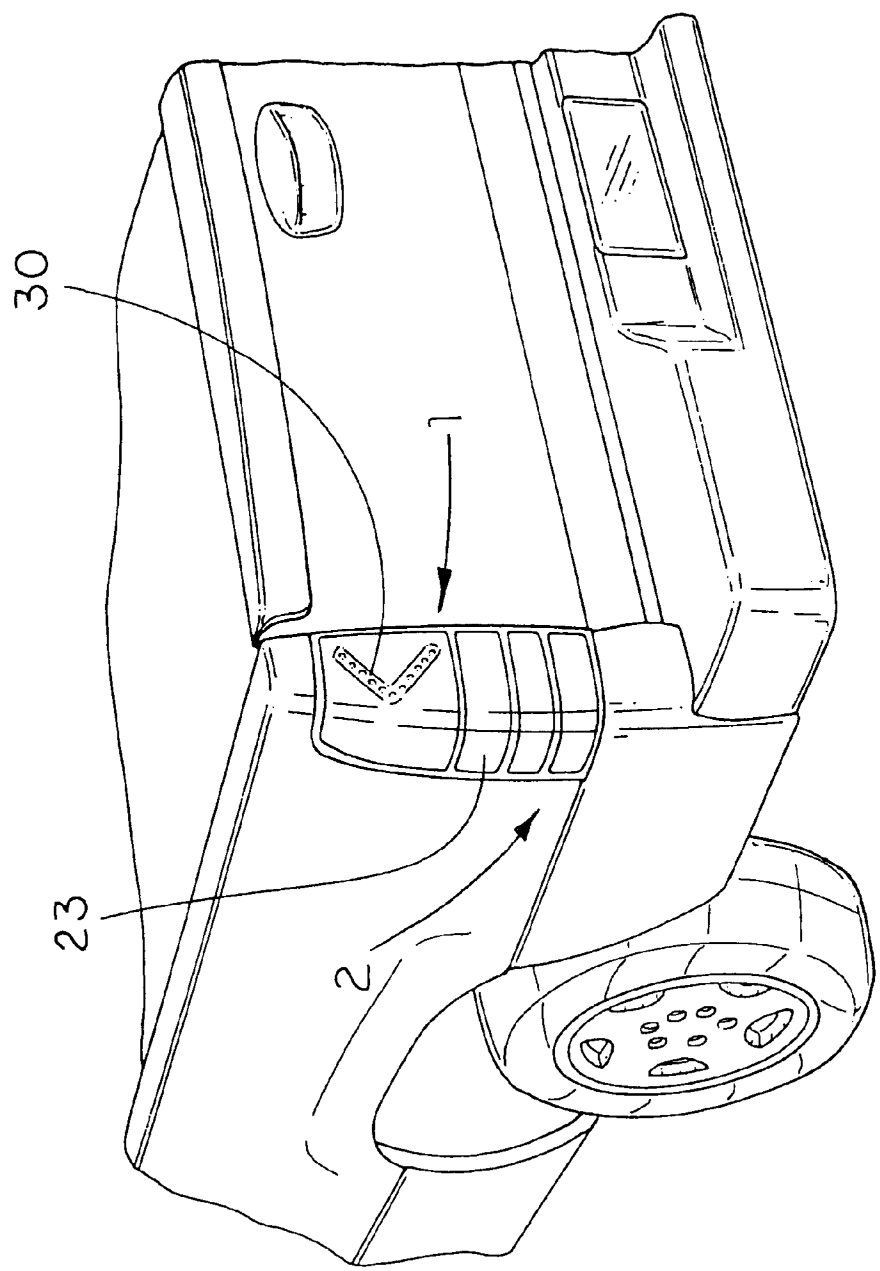
FIG. 1 is a perspective view of a lighting directional sign for vehicle signal light according to a first preferred embodiment of the present invention, illustrating the lighting directional sign being installed in a vehicle signal light.

Referring to FIG. 1 of the drawing, a lighting directional sign 1 according to a preferred embodiment of the present invention is illustrated, wherein the lighting directional sign 1 is installed into an existing vehicle signal light 2. When the lighting directional sign 1 is electrically connected with the signal light 2 of the existing vehicle, the lighting directional sign 1 is adapted to function as a turn signlight for signifying the further motion of the vehicle clearly. Alternatively, the lighting directional sign 1 can also be built in the existing vehicle signal light 2 as an auxiliary turn signlight.

Figure 2:
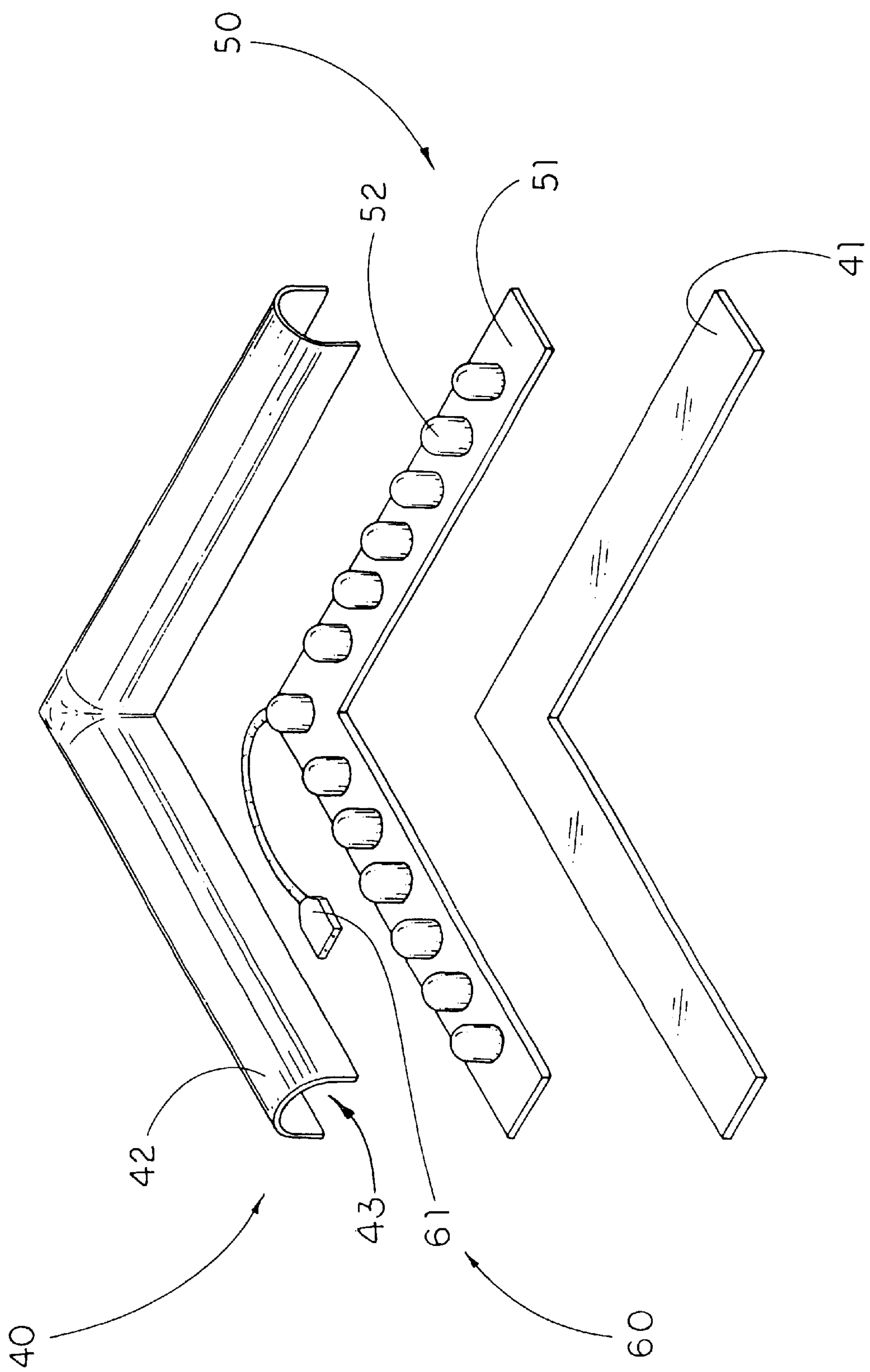
FIG. 2 is an exploded perspective of the lighting directional sign for vehicle signal light according to the above first preferred embodiment of the present invention.
Figure 3:
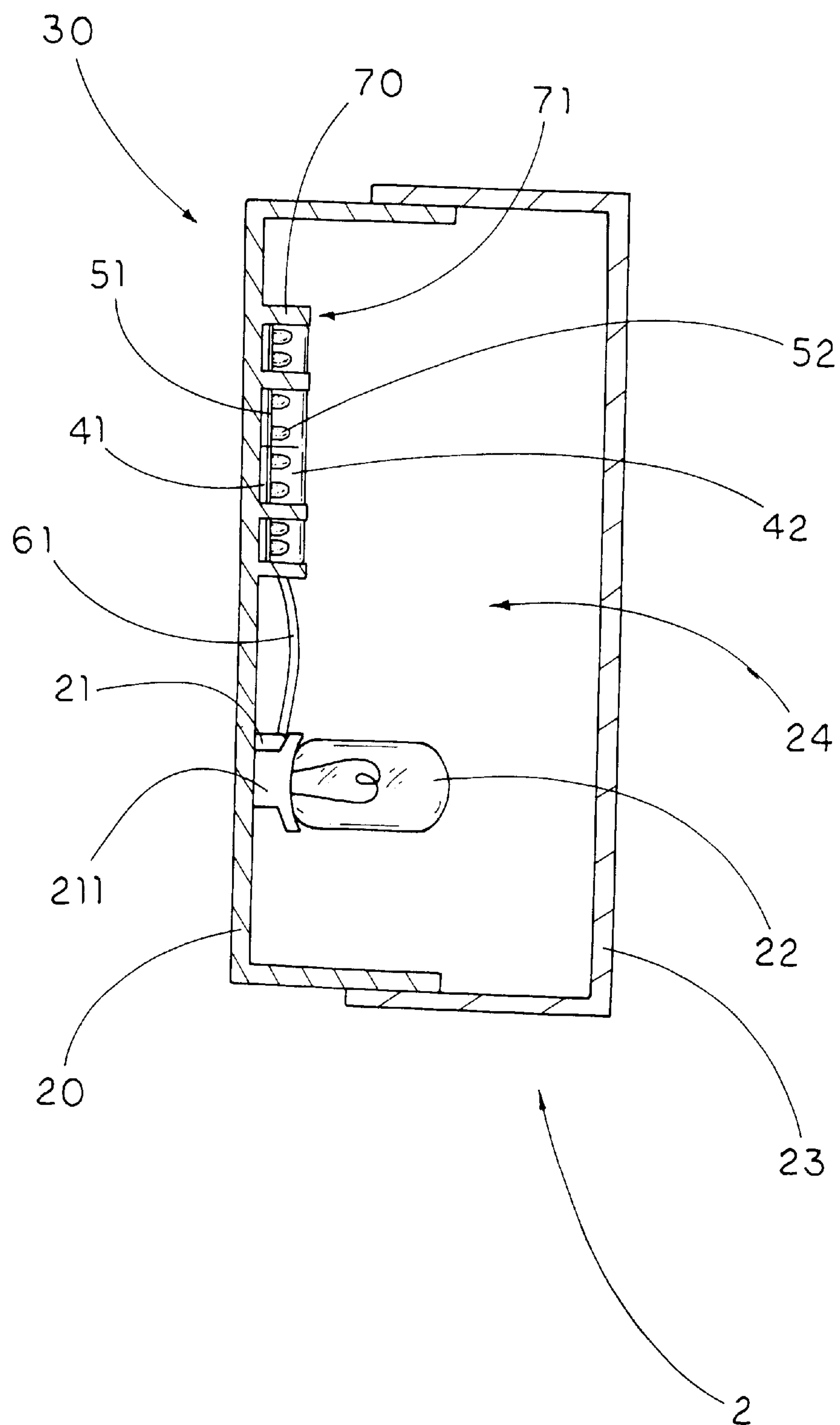
FIG. 3 is a sectional view of the lighting directional sign for vehicle signal light according to the above first preferred embodiment of the present invention.

As shown in FIGS. 2 and 3, the existing vehicle signal light 2 comprises a base plate 20 comprising a power outlet 21 electrically connected with a bulb socket 211 and a light bulb 22 electrically replaceably mounted on the bulb socket 211, and a lamp cover 23 for covering the base plate 20 wherein a signal light chamber 24 is provided therebetween. The lamp cover 23, such as the conventional lamp cover, is made of translucent material in such a manner when the light bulb 22 is switched off, the base plate 20 including the light bulb 22 cannot be seen through from outside. Thus, when the light bulb 22 is switched on, the light from the light bulb 22 can pass through the lamp cover 23 for signifying the further motion of the vehicle.

The lighting directional sign 1 comprises a L-shaped illuminating unit 30 comprising a casing 40, an illuminator 50 protected by the casing 40, and an electric input connector 60 provided on the casing 40 and electrically connected with the illuminator 50, wherein the illuminating unit 30 is disposed in the lamp chamber 24 of the signal light 2 and electrically connected with the power outlet 21 of the base plate 20.

According to the preferred embodiment, the casing 40 of the illuminating unit 30 comprises a protective layer 41 and a shelter 42 having a transparent front surface. The shelter 42 is made of transparent and waterproof material such as plastic wherein the shelter 42 having a U-shaped cross section is shaped as a L-shape. The protective layer 41 is shaped as a L-shaped respective to the shelter 42 wherein the shelter 42 is sealedly attached to the protective layer 41 to define a lighting chamber 43 therebetween to receive the illuminator 50 therein. Accordingly, the protective layer 41 is made of resin such that the illuminator 50 is well protected by the casing 40 in such a water tight manner.

The illuminator 50 comprises a circuit board 51 sealedly mounted on the protective layer 41 and covered by the shelter 42 in a water tight manner, and a plurality of LEDs 52 electrically connected on the circuit board 51 in such a manner the LEDs 52 are spacedly aligned and affixed on the circuit board 51. The circuit board 51 of the illuminator 50 is also shaped corresponding to the casing 40 which is L-shape such that the illuminator 50 is fittingly received in the casing 40. Moreover, since the shelter 42 of the casing 40 is made of transparent material, the lightened LEDs 52 can be viewed from outside.

The electric input connector 60, according to the first preferred embodiment, is a conductive wire 61 securely extended from the circuit board 51 of the illuminator 50 wherein the conductive wire 61 of the electric input connector 60 is adapted to detachably connect with the power outlet 21 of the signal light 2 for electrically connecting between the circuit board 51 and the power outlet 21 of the signal light 2.

According to the first preferred embodiment, the lighting directional sign 1 is mounted on the base plate 20 of the signal light 2. As shown in FIG. 3, the illuminating unit 30 is attached on the base plate 20 wherein the conductive wire 61 of the electric input connector 60 is connected to the power outlet 21 of the signal light 2. The illuminating unit 30 is aligned as an arrowhead shape in such a manner when the light bulb 22 of the signal light 2 is switched on, the illuminating unit 30 is automatically switched on, so as to lighten the LEDs 52 as a turning symbol for signifying the further motion of the vehicle. As it is mentioned above, when the light bulb 22 of the signal light 2 is switched off, the illuminating unit 30 cannot be seen through from outside. However, when the LEDs 52 are arranged to lighten, the illuminating unit 30 can be indicated clearly and the light from the LEDs 52 can be visible from outside.

In order to hold the illuminating unit 30 in position, the lighting directional sign further comprises a pair of guider walls 70 outwardly protruded from the base plate 20 of the signal light 2 wherein the guider walls 70 each having a L-shaped are parallel to other each and defined a guider cavity 71 therebetween. So, the illuminating unit 30 is fittingly disposed in the guider cavity 71 so as to hold the illuminating unit 30 in position.

Figure 4:
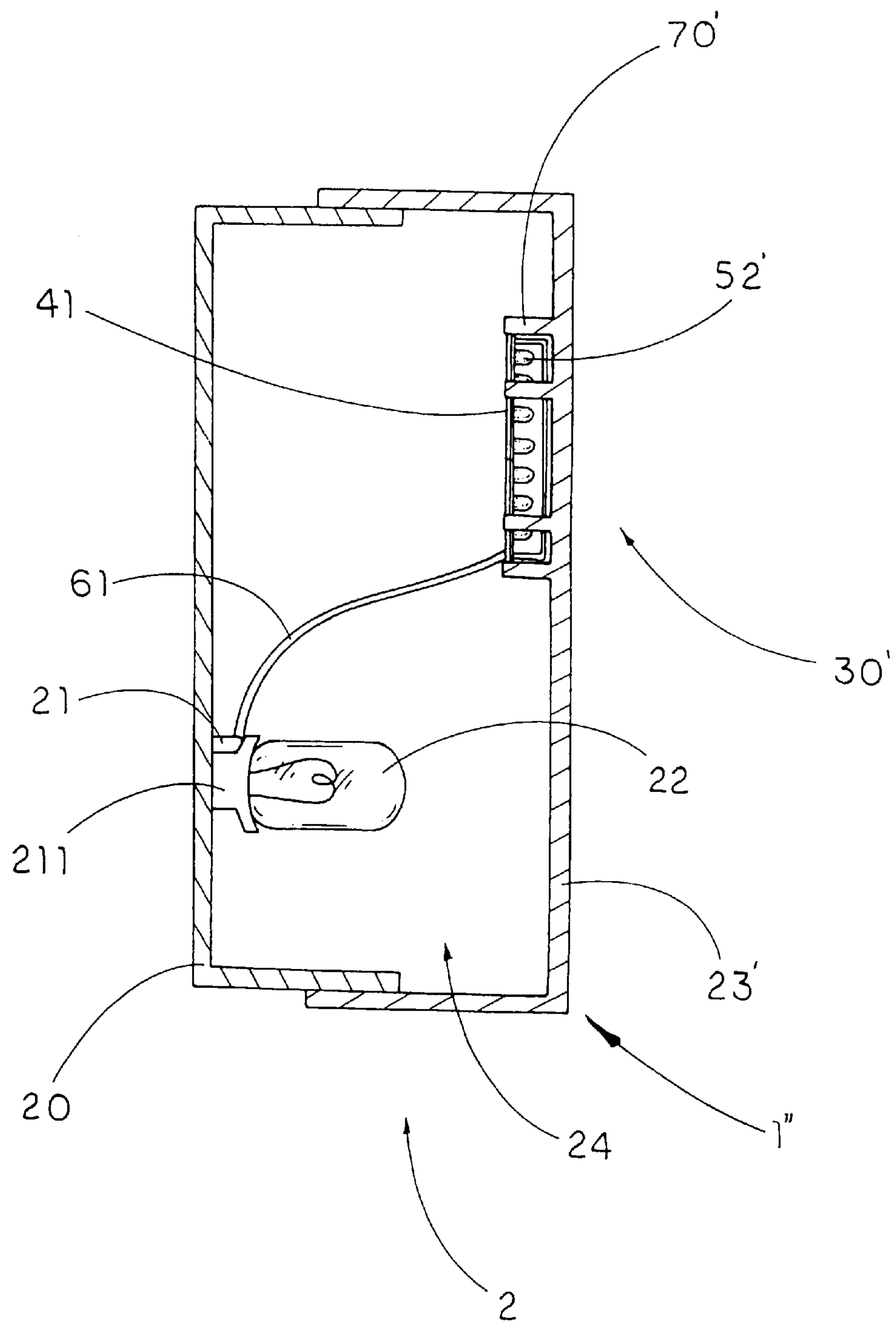
FIG. 4 is a sectional view of the lighting directional sign for vehicle signal light according to a second preferred embodiment of the present invention.

Referring to FIG. 4 of the drawing, a light directional sign 1' for vehicle signal light 2 according to a second preferred embodiment of the present invention is illustrated, wherein the illuminating unit 30' is attached on an inner surface of the lamp cover 23'. Since the lamp chamber 24 has its depth, when the illuminating unit 30' is attached on a back of the lamp chamber 24, which is mounted on the base plate 20, the light from the lightened LEDs 52' may partially spread out in the lamp chamber 24 and then pass through the lamp cover 23' to outside. So, the illuminating unit 30' may not signify clear enough especially the light of LEDs 52' is getting dull if the lamp chamber 24 is huge. So, when the illuminating unit 30' is attached on the inner surface of the lamp cover 23', the light of the LEDs 52' will directly pass through the lamp cover 23' in order to brighten the illuminating unit 30'. Thus, since the lamp cover 23' is translucent, people will not able to view the illuminating unit 30' from outside in order to keep the beauty appearance of the vehicle.

Figure 4A:
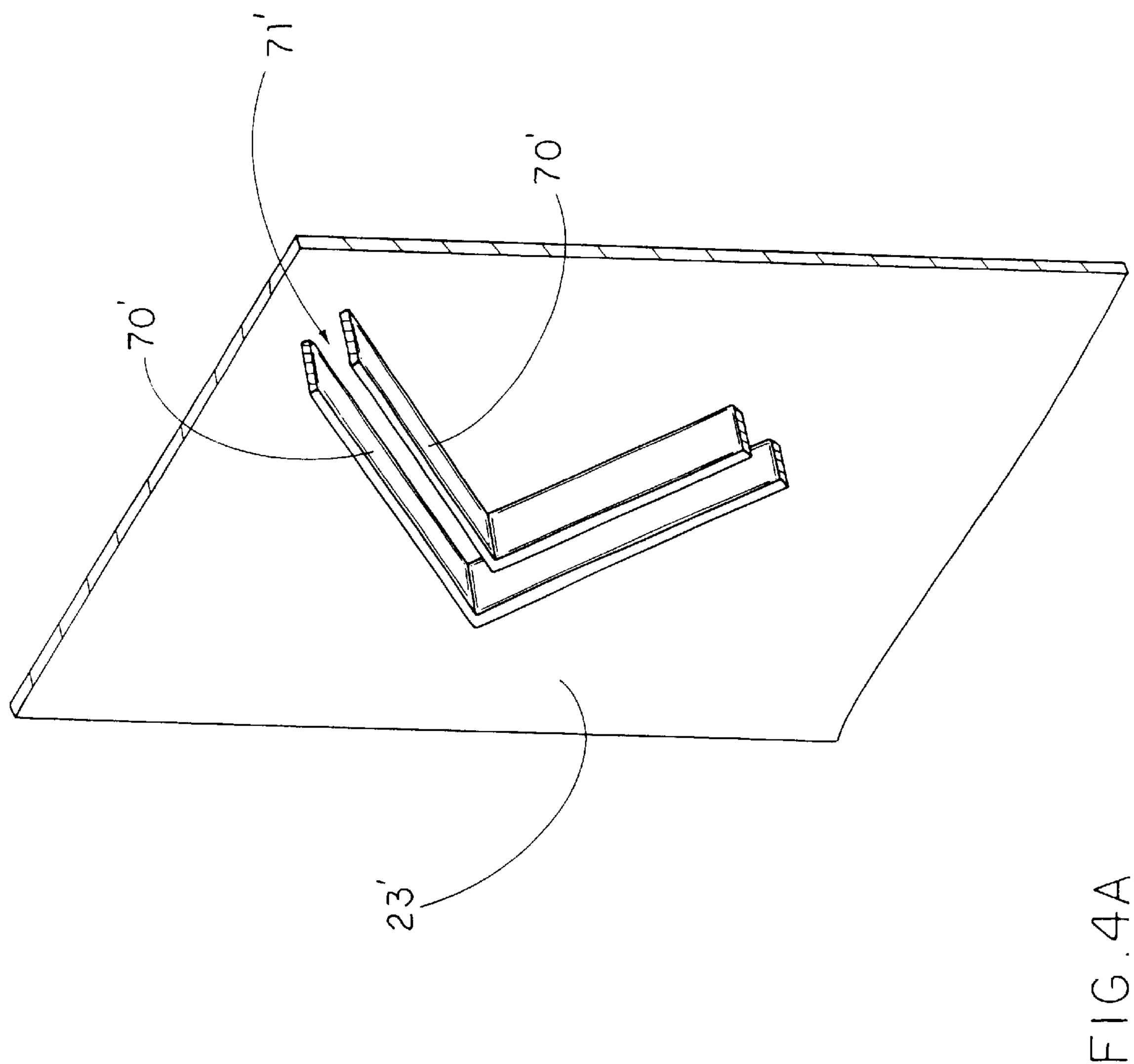
FIG. 4A is a perspective view of the lighting directional sign for vehicle signal light according to the above second preferred embodiment of the present invention, illustrating the guider means being mounted on the lamp cover.

Furthermore, as shown in FIG. 4A, the guider walls 70' each having a L-shaped are parallelly and inwardly protruded from the lamp cover 23' and defined a guider cavity 71' between the two guider walls 70' such that the illuminating unit 30' is fittingly disposed in guider cavity 71' for holding the illuminating unit 30' in position.

Furthermore, as shown in FIG. 4A, the guider walls 70' each having a L-shaped are parallelly and inwardly protruded from the lamp cover 23' and defined a guider cavity 71' between the two guider walls 70' such that the illuminating unit 30' is fittingly disposed in guider cavity 71' for holding the illuminating unit 30' in position.

Figure 5:
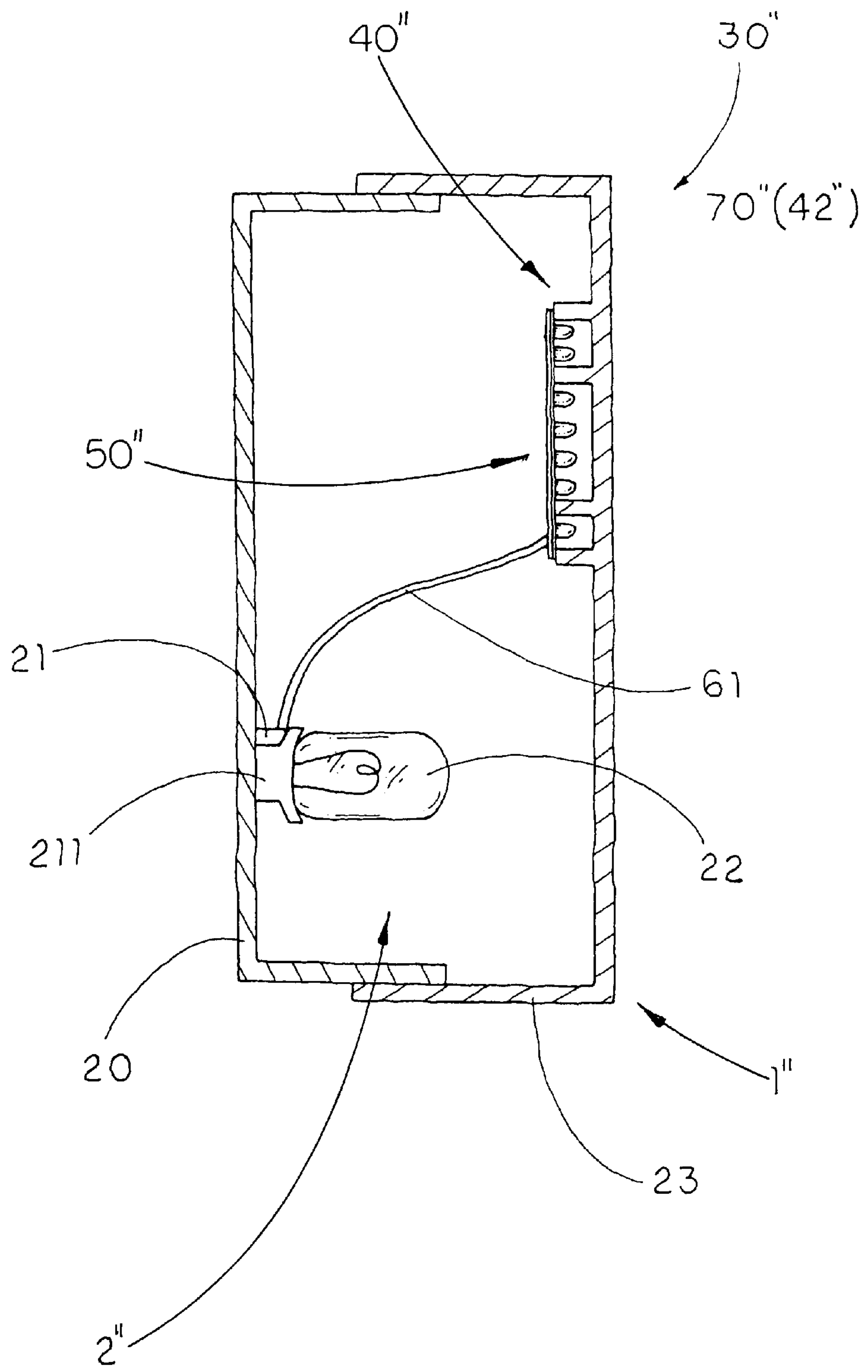
FIG. 5 is a sectional view of the lighting directional sign for vehicle signal light according to a third preferred embodiment of the present invention.
Figure 5A:
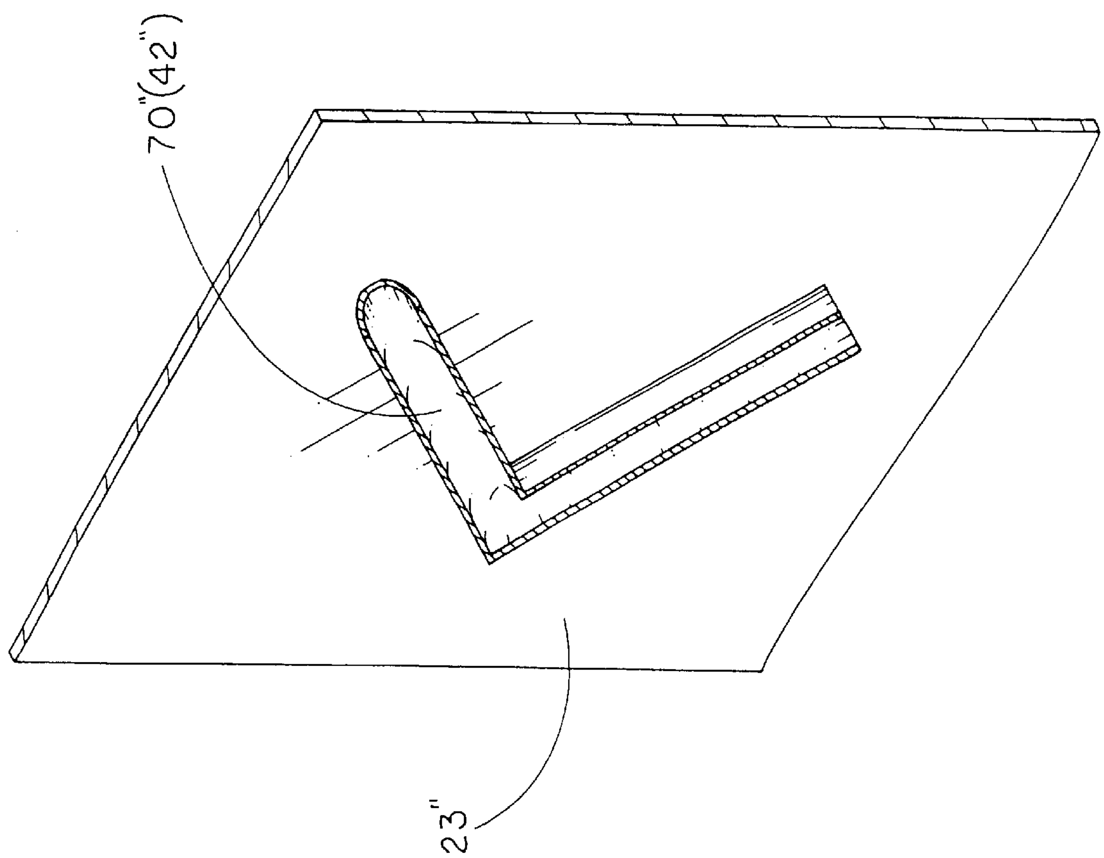
FIG. 5A is a perspective view of the lighting directional sign for vehicle signal light according to the above third preferred embodiment of the present invention, illustrating the guider means being mounted on the lamp cover.

Referring to FIG. 5, a lighting directional sign 1" according to another alternative embodiment of the present invention, wherein the illuminating unit 30" basically is an alternative mode of the second embodiment, which is also attached on the lamp cover 23". However, the shelter 42" of the casing 40" is formed as the guider walls 70" wherein the shelter 42" is integrally and inwardly extended from the lamp cover 23, as shown in FIG. 5A, such that the illuminator 50" is directly received in the shelter 42" (guider walls 70"). So, the light from the LEDs 52 can directly pass through the lamp cover 23" only rather than pass through both the shelter and the lamp cover 23' in the second embodiment. Thus, the third embodiment is good for the vehicle that the illuminating unit 30" is built-in to the signal light 2" since the shelter 42" is already formed on the lamp cover 23" in the manufacturing process.

Figure 6:
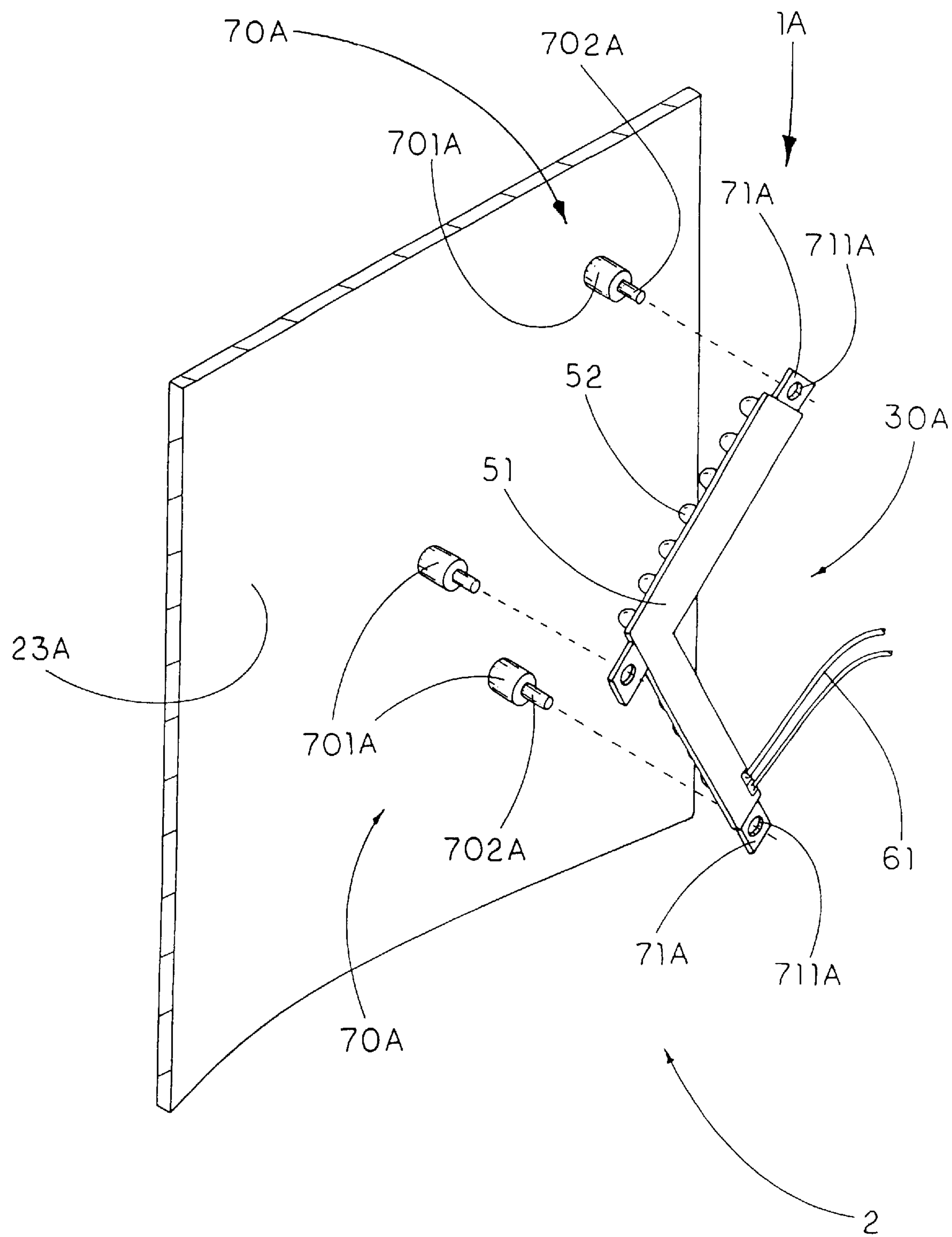
FIG. 6 is a perspective view of the lighting directional sign for vehicle signal light according to a fourth preferred embodiment of the present invention.
Figure 6A:
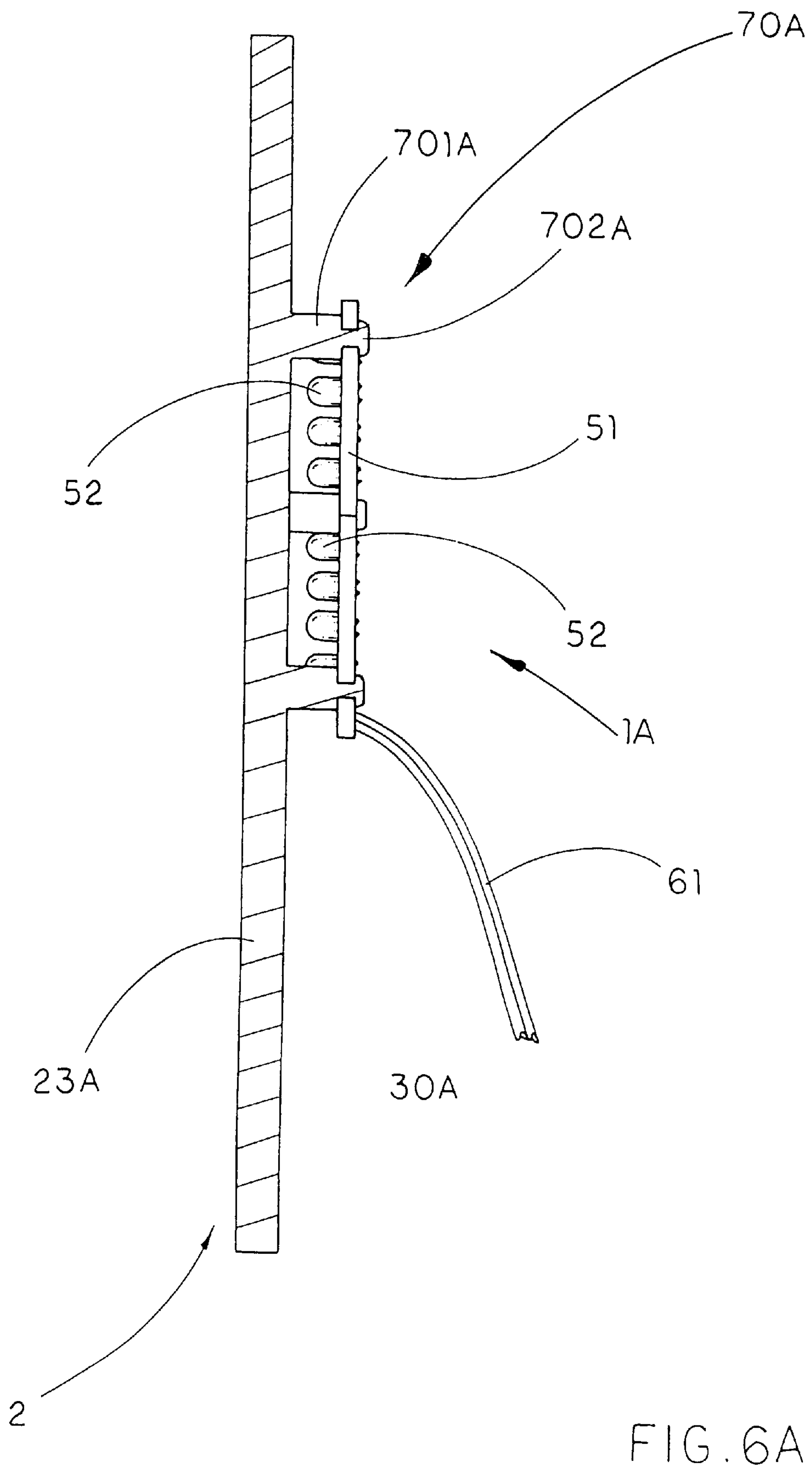
FIG. 6A is a sectional view of the lighting directional sign for vehicle signal light according to the above fourth preferred embodiment of the present invention.

As shown in FIGS. 6 and 6A, a lighting directional sign 1A according to a fourth embodiment of the present invention is illustrated, wherein the illuminating unit 30A is directly attached on the lamp cover 23A. In order to mount the illuminating unit 30A on the lamp cover 23A, three rod-like projections 70A are inwardly protruded from the lamp cover 23A wherein the projections 70A are aligned as a V shape with respect to the illuminating unit 30. Thus, each projection 70A has a first portion 701A inwardly extended from the lamp cover 23A and a second portion 702A coaxially extended from the first portion 701A wherein the first portion 701A of the projection 70A has a diameter larger than a diameter of the second portion 702A thereof.

Moreover, three mounting plate 71A each having an engaging slot 711A provided thereon extended on three corners of the illuminating unit 30A wherein each projection 70A is fittingly inserted into the respective engaging slot 711A in such a manner the three corners of the illuminating unit 30A are securely attached on the lamp cover 23A. Each engaging slot 711A has a diameter slightly larger than the diameter of the second portion 702A of the projection 70A and smaller than the diameter of the first portion 701A thereof, in such a manner the engaging slot 711A is fittingly inserted into the second portion 702A of the projection 70A wherein the mounting plate 71A is blocked by a top end of the first portion 701A of the projection 70A.

Preferably, each top end of the second portion 702A of the projections 70A, after the respective mounting plate 71A is mounted thereon, can be melted, as shown in FIG. 6A, in order to lock up the illuminating unit 30A on the lamp cover 23A, so as to prevent the illuminating unit 30A in a slidably movable manner.

In accordance with the above embodiments as disclosed above, the lighting directional sign 1 of the present invention can signify the further motion of the vehicle clearly. Moreover, the installation of the lighting directional sign 1 is simple and easy and does not require to alter the original structure of the vehicle signal light 2 so as to minimize the manufacturing cost of incorporating the present invention with the existing vehicle. Thus, the lighting directional sign 1 is hidden inside the signal light 2 in order to keep the beauty shape of the vehicle.

What is claimed is:

1. A lighting directional sign for vehicle signal light comprising a base plate, a power outlet, and a lamp cover for covering said base plate so as to define a signal light chamber between said base plate and said lamp cover; and a L-shaped illuminating unit, which is disposed in said signal light chamber of said signal light, with a casing, an illuminator protected by said casing, and an electric input connector provided on said casing and electrically connected said illuminator to said power outlet of said base plate, wherein said illuminating unit is aligned as an arrowhead shape in such a manner when said signal light is switched on, said illuminating unit is automatically switched on in order to signify a further directional motion of said vehicle; and three rod-like projections outwardly protruded from an inner surface of said lamp cover for engaging with three mounting plates, each having an engaging slot, extended from three corners of said illuminating unit respectively, so as to substantially mount said illuminating unit on said lamp cover.

2. A lighting directional sign for vehicle signal light comprising a base plate, a power outlet, and a lamp cover for covering said base plate so as to define a signal light chamber between said base plate and said lamp cover; and a L-shaped illuminating unit, which is disposed in said signal light chamber of said signal light, with a casing, an illuminator protected by said casing, and an electric input connector provided on said casing and electrically connected said illuminator to said power outlet of said base plate, wherein said illuminating unit is aligned as an arrowhead shape in such a manner when said signal light is switched on, said illuminating unit is automatically switched on in order to signify a further directional motion of said vehicle, wherein said casing of said illuminating unit has a shelter having a transparent front surface and a protective layer sealedly attached to said shelter in a water tight manner, wherein said illuminator is disposed in a lighting chamber defined between said protective layer and said shelter, wherein said illuminator has a L-shaped circuit board securely mounted on said protective layer and covered by said shelter, and a plurality of LEDs electrically and spacedly mounted on said circuit board and align to form a L-shape; and three rod-like projections outwardly protruded from an inner surface of said lamp cover for engaging with three mounting plates, each having an engaging slot, extended from three corners of said illuminating unit respectively, so as to substantially mount said illuminating unit on said lamp cover.

3. A lighting directional sign for vehicle signal light, as recited in claim 2, wherein each of said projections has a first portion and a second portion and each engaging slot has a diameter slightly larger than a diameter of said second portion of said projection and smaller than a diameter of said first portion thereof in such a manner said mounting plate is biased against a top end of said first portion of said projection when said projection is inserted into said engaging slot to mount said illuminating unit on said lamp cover.

4. A lighting directional sign for vehicle signal light, as recited in claim 3, wherein each top end of said second portion of said projections is melted after said respective mounting plate is mounted thereon, so as to firmly lock up said illuminating unit on said lamp cover.

5. A lighting directional sign for vehicle signal light comprising a base plate, a power outlet, and a lamp cover for covering said base plate so as to define a signal light chamber between said base plate and said lamp cover; and a L-shaped illuminating unit, which is disposed in said signal light chamber of said signal light, with a casing, an illuminator protected by said casing, and an electric input connector provided on said casing and electrically connected said illuminator to said power outlet of said base plate, wherein said illuminating unit is aligned as an arrowhead shape in such a manner when said signal light is switched on, said illuminating unit is automatically switched on in order to signify a further directional motion of said vehicle, wherein said casing of said illuminating unit has a shelter having a transparent front surface and a protective layer sealedly attached to said shelter in a water tight manner, wherein said illuminator is disposed in a lighting chamber defined between said protective layer and said shelter, wherein said illuminator has a L-shaped circuit board securely mounted on said protective layer and covered by said shelter, and a plurality of LEDs electrically and spacedly mounted on said circuit board and align to form a L-shape, wherein said electric input connector has a conductive wire electrically extended from said circuit board and detachably connected to said power outlet of said signal light; and three rod-like projections outwardly protruded from an inner surface of said lamp cover for engaging with three mounting plates, each having an engaging slot, extended from three corners of said illuminating unit respectively, so as to substantially mount said illuminating unit on said lamp cover.

6. A lighting directional sign for vehicle signal light, as recited in claim 5, wherein each of said projections has a first portion and a second portion and each engaging slot has a diameter slightly larger than a diameter of said second portion of said projection and smaller than a diameter of said first portion thereof in such a manner said mounting plate is biased against a top end of said first portion of said projection when said projection is inserted into said engaging slot to mount said illuminating unit on said lamp cover.

7. A lighting directional sign for vehicle signal light, as recited in claim 6, wherein each top end of said second portion of said projections is melted after said respective mounting plate is mounted thereon, so as to firmly lock up said illuminating unit on said lamp cover.

* * * * *